United States Patent
Pursifull et al.

(10) Patent No.: US 10,968,879 B2
(45) Date of Patent: Apr. 6, 2021

(54) SYSTEMS AND METHODS FOR CATALYST HEATING

(71) Applicant: Ford Global Technologies, LLC, Dearborn, MI (US)

(72) Inventors: Ross Dykstra Pursifull, Dearborn, MI (US); Joseph Ulrey, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 347 days.

(21) Appl. No.: 15/886,299

(22) Filed: Feb. 1, 2018

(65) Prior Publication Data

US 2019/0234367 A1  Aug. 1, 2019

(51) Int. Cl.
| | |
|---|---|
| *F02P 5/04* | (2006.01) |
| *F02D 41/00* | (2006.01) |
| *F02P 5/15* | (2006.01) |
| *F02D 37/02* | (2006.01) |
| *F02D 41/02* | (2006.01) |
| *F02D 41/08* | (2006.01) |
| *F02D 31/00* | (2006.01) |

(52) U.S. Cl.
CPC .......... *F02P 5/1508* (2013.01); *F02D 37/02* (2013.01); *F02D 41/0002* (2013.01); *F02D 41/0245* (2013.01); *F02D 41/08* (2013.01); *F02P 5/045* (2013.01); *F02D 31/001* (2013.01); *F02D 31/003* (2013.01); *F02D 41/0255* (2013.01); *F02D 2250/24* (2013.01)

(58) Field of Classification Search
CPC .......... F02P 5/1508; F02P 5/045; F02P 5/145; F02D 41/0002; F02D 41/0245; F02D 37/02; F02D 41/08; F02D 2250/24; F02D 41/0255; F02D 31/001; F02D 31/003; F02N 2200/106; F01N 5/02; F01N 3/2006
See application file for complete search history.

(56) References Cited

U.S. PATENT DOCUMENTS

| | | | | |
|---|---|---|---|---|
| 4,096,843 | A * | 6/1978 | Marsee | F02D 37/02 123/406.69 |
| 7,100,362 | B2 | 9/2006 | McGee et al. | |
| 7,395,659 | B2 | 7/2008 | Pott | |
| 7,778,767 | B2 * | 8/2010 | Santoso | F02D 41/0087 123/179.16 |
| 8,499,547 | B2 * | 8/2013 | Mitsutani | B60K 6/445 60/284 |
| 9,090,251 | B2 * | 7/2015 | Watanabe | F02P 5/1508 |
| 9,145,133 | B2 * | 9/2015 | Liang | B60W 10/06 |
| 9,228,760 | B2 * | 1/2016 | Welle | F24H 3/08 |
| 9,523,339 | B2 * | 12/2016 | Fujita | F02N 11/0848 |

(Continued)

*Primary Examiner* — David Hamaoui
(74) *Attorney, Agent, or Firm* — Geoffrey Brumbaugh McCoy Russell LLP (57) ABSTRACT

Methods and systems are provided for an exhaust catalyst heating strategy that uses spark retard to increase an amount of heat output by an engine without a combustion stability limit. In one example, a method may include, during an engine cold start, applying an ignition spark at a timing that produces substantially zero combustion torque while maintaining an engine speed greater than a threshold speed via electric motor torque. Furthermore, an amount of heat output by the engine may be controlled by adjusting an airflow through the engine, such as by adjusting one or more of a throttle position and the engine speed.

7 Claims, 4 Drawing Sheets

(56) References Cited

U.S. PATENT DOCUMENTS

| | | | |
|---|---|---|---|
| 9,669,822 B2* | 6/2017 | Piper | B60W 10/06 |
| 9,786,181 B2* | 10/2017 | Jo | F02D 41/403 |
| 10,029,673 B2* | 7/2018 | Okubo | B60W 10/08 |
| 10,100,754 B2* | 10/2018 | Srinivasan | F02D 17/02 |
| 10,214,219 B2* | 2/2019 | Richards | F02D 41/005 |
| 10,302,033 B2* | 5/2019 | Hamamoto | F02D 41/024 |
| 10,464,564 B2* | 11/2019 | Miller | B60W 10/184 |
| 10,518,764 B2* | 12/2019 | Cao | B60W 10/18 |
| 2008/0066457 A1* | 3/2008 | Kim | B60K 6/48 |
| | | | 60/286 |
| 2009/0199560 A1* | 8/2009 | Maier | B60K 6/485 |
| | | | 60/700 |
| 2015/0283990 A1 | 10/2015 | Ulrey et al. | |
| 2019/0160912 A1* | 5/2019 | Amano | B60H 1/00885 |

\* cited by examiner

SYSTEMS AND METHODS FOR CATALYST HEATING

FIELD

The present description relates generally to systems and methods for expediting heating of an exhaust catalyst while controlling engine idle speed.

BACKGROUND/SUMMARY

Vehicles include emission control devices, such as exhaust catalysts, to reduce emissions generated through combustion. However, the effectiveness of such emission control devices varies with operating temperature. Typically, a "light-off" temperature is used to signify a temperature above which a high catalyst efficiency is achieved, enabling the catalyst to effectively decrease vehicle emissions. Therefore, during engine cold start conditions, various control strategies may be employed to expedite catalyst heating. As one example, spark timing may be retarded to increase exhaust heat, thereby increasing the catalyst temperature at a faster rate. However, as the spark timing is retarded further (to obtain more heat), combustion stability (e.g., a consistency of an amount of combustion torque produced from combustion event to combustion event) decreases. This inconsistency in combustion torque leads to inconsistent engine speeds, which causes engine vibrations that may degrade customer satisfaction. Further, such vibrations may also degrade engine idle speed control and lead to engine stalling. Therefore, the amount of exhaust heat generated through retarded spark timing is limited by combustion stability.

Other attempts to address combustion stability due to retarded spark timing during catalyst heating include using torque from an electric motor to compensate for reduced ignition efficiency (e.g., an ability to produce torque through combustion). One example approach is shown by Kim et al. in U.S. 2008/0066457 A1. Therein, spark is retarded to a timing within a range from 50% to 70% of a maximum ignition efficiency, and electric motor torque is used to compensate for the reduced ignition efficiency and maintain a stable no-load operating state of the engine.

However, the inventors herein have recognized potential issues with such systems. As one example, providing spark at a timing within the 50% to 70% ignition efficiency range may produce highly variable combustion torque. The highly variable combustion torque may result in variable engine speeds, which may result in noise, vibration, and harshness (NVH) issues that degrade customer satisfaction.

In one example, the issues described above may be addressed by a method, comprising: during a cold start of an engine, applying an ignition spark to combust fuel and a portion of air entering the engine at an ignition timing set to produce substantially zero combustion torque while rotating the engine with an electric motor and maintaining an engine speed greater than a threshold speed via electric motor torque; and adjusting the amount of air entering the engine based on a desired engine exhaust heat. In this way, engine speed may be kept substantially constant during catalyst heating, reducing engine vibrations and increasing customer satisfaction.

As one example, the timing that produces substantially zero combustion torque corresponds to a timing region that minimizes an indicated mean effective pressure (IMEP) within engine cylinders and has minimal variability. With minimal IMEP variability, cycle-to-cycle variations in combustion torque, and thus cycle-to-cycle variations in engine speed, are reduced. Instead of combustion torque spinning the engine, the engine is rotated at a substantially constant speed via an electric machine. Furthermore, the engine airflow rate may be adjusted by increasing an opening of an intake air throttle as the desired engine exhaust heat increases. If additional exhaust heat (e.g., engine heat output) is desired at wide-open throttle, the engine speed may be increased, such as by increasing the electric motor torque, to further increase the engine airflow rate. By first adjusting the opening of the intake air throttle to provide the desired engine exhaust heat, engine speed variations may be further decreased. In this way, an amount of heat output by the engine may be controlled independently of combustion stability and without engine speed variations that may be felt negatively by customers.

In another example, a method comprises: in response to a cold start condition of an engine included in a vehicle, providing spark to ignite fuel and a portion of air entering the engine at an ignition timing retarded from a timing for maximum break torque, the retarded ignition timing determined based on an occupancy of the vehicle and provided while providing electric motor torque to the engine via an electric machine to maintain a speed of the engine above a threshold speed; and adjusting one or more of a position of a throttle coupled to an air intake passage of the engine and the engine speed, maintained by the electric machine, based on a temperature of a catalyst coupled to an exhaust passage of the engine and the occupancy of the vehicle. For example, spark may be further retarded (e.g., to a region that produces substantially zero combustion torque) when the vehicle is occupied, and spark may be less retarded (e.g., to a region with low combustion stability) when the vehicle is unoccupied (e.g., such as when the vehicle is an autonomous vehicle), thereby reducing an amount of electric motor torque provided by the electric machine. In this way, engine speed variations may be minimized when occupants are present, increasing occupant satisfaction, and energy consumption may be reduced when the vehicle is unoccupied.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
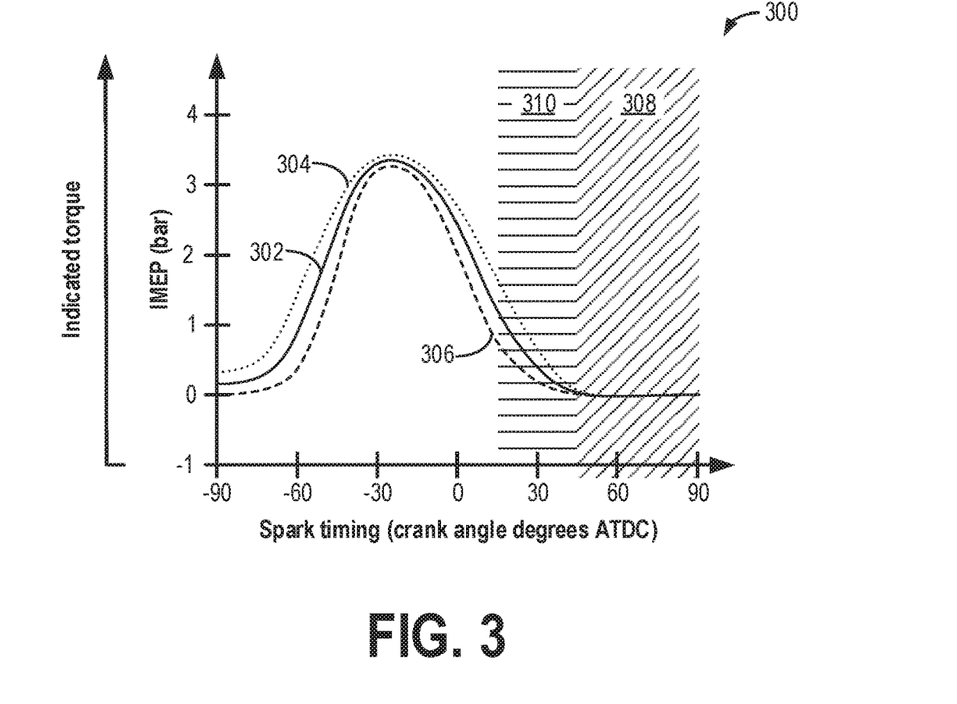
FIG. 3 depicts a graph showing a relationship between spark timing and mean indicated effective pressure.
Figure 4:
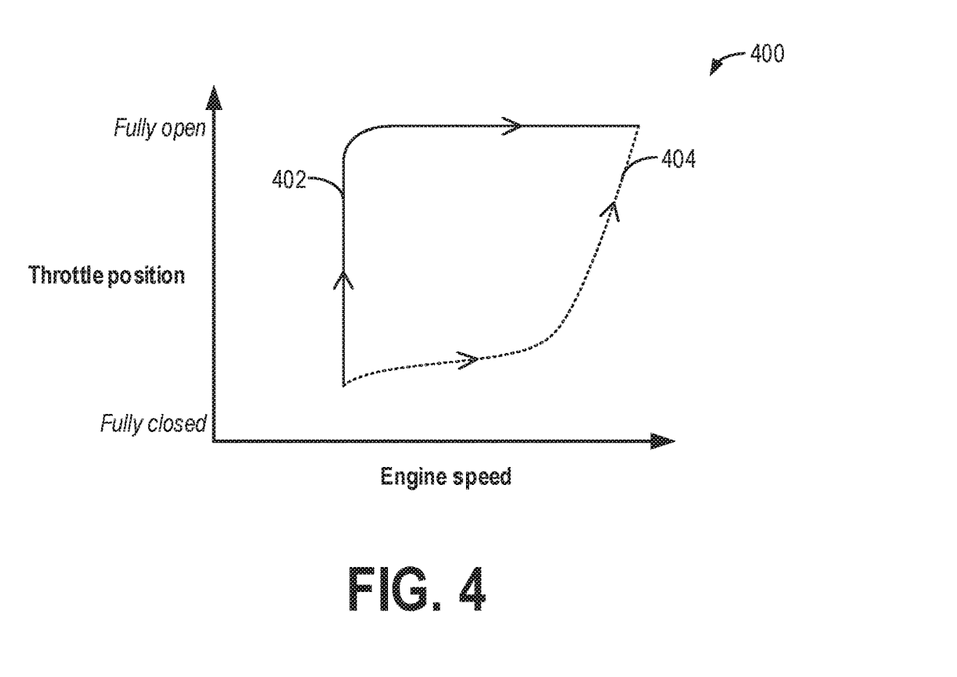
FIG. 4 illustrates a graph of throttle position and/or engine speed adjustments that may be performed to increase an amount of heat output by an engine.

The following description relates to systems and methods for operating an engine in a catalyst heating mode without a combustion stability limit. As used herein, the term "combustion stability" refers to a sameness of combustion torque from combustion event to combustion event. The engine may be included in a vehicle, such as the vehicle schematically shown in FIG. 1, which may be an autonomous vehicle in some examples. For example, the engine may be operated in the catalyst heating mode by deeply retarding spark timing and spinning the engine via electric motor torque to maintain a consistent engine speed, such as according to the example method of FIG. 2. In some examples, spark may be retarded to a timing that corresponds to an indicated mean effective pressure of zero, resulting in no combustion torque. A relationship between the spark timing and the indicated mean effective pressure is shown in FIG. 3. Furthermore, an amount of heat output by the engine while operating in the catalyst heating mode may be controlled by adjusting an airflow rate through the engine, such as by adjusting a position of an intake air throttle and/or by adjusting the engine speed, as shown in FIG. 4. An example of operating the engine in the catalyst heating mode is shown with reference to FIG. 5, which may be different when the vehicle is occupied or when the vehicle is an unoccupied autonomous vehicle.

Figure 1:
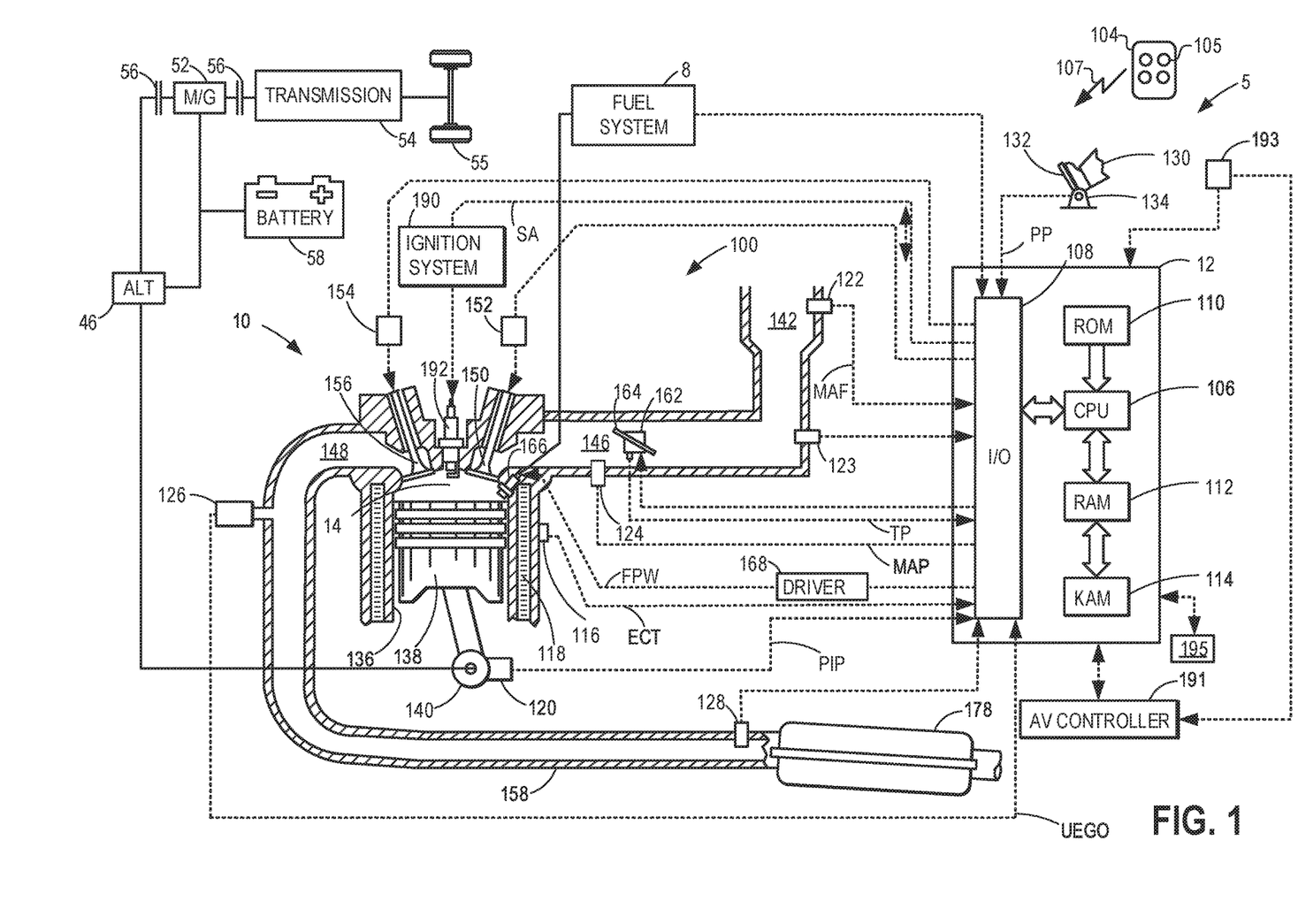
FIG. 1 shows a schematic depiction of an example vehicle system.

FIG. 1 depicts an example of a cylinder 14 of an internal combustion engine 10, which may be included in an engine system 100 in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown in FIG. 1, vehicle 5 includes engine 10 and an electric machine 52. Electric machine 52 may be a motor or a motor/generator. For example, electric machine 52 may be a 48 V (or higher) system with an operating power of at least 10 kW. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems, including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

In the case of an autonomous vehicle (AV), operator 130 may be substituted prior to the start of or en route during a specified trip by an autonomous vehicle controller 191 included the control system and in communication with controller 12. AV controller 191 may provide indications and/or requested output of vehicle 5 to controller 12. Controller 12, in accordance with the requests from AV controller 191, may then actuate various vehicle actuators to propel the vehicle. In the case of an AV, vehicle 5 may include various devices for detecting vehicle surroundings, such as radar, laser light, GPS, odometry, and computer vision sensors. Advanced control systems, as part of AV controller 191, may interpret sensory information to identify appropriate navigation paths as well as obstacles and relevant signage (e.g., speed limits, traffic signals, and the like). AV controller 191 may further include executable instructions that are capable of analyzing the sensory data to distinguish between different vehicles on the road, which may aid in planning a path to a desired destination, as well as executable instructions to, in combination with sensory feedback, park a vehicle in a designated or detected available parking space. For example, AV controller 191 may include executable instructions to detect a type of roadway (e.g., a one-way street, a freeway, a divided highway, and the like) or an available parking space (e.g., an empty space with enough clearance for the vehicle that is not prohibited based on time of day or loading zone, and the like). Thus, in some examples, vehicle 5 may be controlled using input from vehicle operator 130, and in other examples, vehicle 5 may be controlled using executable instructions included in AV controller 191 and without input from vehicle operator 130, such as when vehicle operator 130 is not present. Furthermore, the AV may include an occupancy sensor 193 to determine whether passengers are present. Occupancy sensor 193 may include one or more of a camera, an infrared sensor, a microphone, a door ajar sensor, a seat pressure sensor, a seatbelt sensor, or any other sensor that may be used to determine whether the vehicle is occupied by one or more occupants (e.g., passengers) and may communicate with controller 12 and/or AV controller 191. For example, based on an output received by controller 12 by occupancy sensor 193, controller 12 may make a determination of whether at least one passenger is present in vehicle 5. Based on the determination of whether at least one passenger is present in vehicle 5, AV controller 191 and/or controller 12 may alter operation of engine 10. For example, spark timing adjustments made during an engine cold start may be different for an occupied AV versus an unoccupied AV, as further described with respect to FIG. 2.

Furthermore, in some examples, controller 12 may be in communication with a remote engine start receiver 195 (or transceiver) that receives wireless signals 107 from a key fob 104 having a remote start button 105. In other examples (not shown), a remote engine start may be initiated via a cellular telephone or a smartphone-based system where a user's telephone sends data to a server and the server communicates with the vehicle to start the engine. As such, vehicle 5 may be started while no occupants, including vehicle operator 130, are present in the vehicle even when vehicle 5 is not an AV.

Cylinder 14 of engine 10 can receive intake air via an intake passage 142 and an intake manifold 146. Intake manifold 146 can communicate with other cylinders of engine 10 in addition to cylinder 14. In some examples, intake passage 142 may include one or more boosting devices, such as a turbocharger or a supercharger, coupled therein when the engine system is a boosted engine system. A throttle 162, including a throttle plate 164, may be provided in the intake passage for varying the flow rate and/or pressure of intake air provided to the engine cylinders. A position of throttle 162 may be determined using a throttle position sensor, with the throttle position sensor outputting a signal TP to controller 12 that is proportional to the position of throttle 162. As further described herein, during a catalyst heating mode of operation, an amount of heat output by engine 10 may be controlled by modulating the air flow rate through the engine, such as by adjusting the throttle position. An exhaust manifold 148 can receive exhaust gases from cylinder 14 as well as other cylinders of engine 10.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during an engine start or to reduce an occurrence of engine knock. As further described herein, spark may be retarded to a timing at which the resulting combustion torque is at or near zero while spinning the engine via electric machine 52 during the catalyst heating mode of operation.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternative example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling. An exhaust gas sensor 126 is shown coupled to exhaust manifold 148 upstream of an emission control device 178, coupled within an exhaust passage 158. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor configured to provide an output, such as a voltage signal, that is proportional to an amount of oxygen present in the exhaust gas. The output current of UEGO sensor 126 may be used to adjust engine operation. For example, the amount of fuel delivered to cylinder 14 may be varied using a feed-forward (e.g., based on desired engine torque, engine airflow, etc.) and/or feedback (e.g., using oxygen sensor output) approach in order to achieve a desired air-fuel ratio (AFR), such as stoichiometry. Emission control device 178 may be a three-way catalyst, a NOx trap, various other emission control devices, or combinations thereof. In the example of FIG. 1, emission control device 178 is a three-way catalyst (also referred to herein as a "catalyst") configured to reduce NOx and oxidize CO and unburnt hydrocarbons in the exhaust gas from engine 10.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow (MAF) sensor 122; an engine coolant temperature (ECT) from an engine coolant temperature sensor 116 coupled to a cooling sleeve 118; an ambient temperature from a temperature sensor 123 coupled to intake passage 142; an exhaust gas temperature from a temperature sensor 128 coupled to exhaust passage 158; a profile ignition pickup signal (PIP) from a Hall effect sensor 120 (or other type) coupled to crankshaft 140; throttle position (TP) from the throttle position sensor; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature. Additional sensors, such as various temperature, pressure, and humidity sensors, may be coupled throughout vehicle 5.

Controller 12 receives signals from the various sensors of FIG. 1 and employs the various actuators of FIG. 1 to adjust engine operation based on the received signals and instructions stored on a memory of the controller. For example, as described with respect to FIG. 2, controller 12 may determine a cold start condition from signal ECT from engine coolant temperature sensor 116, and in response thereto, operate in the catalyst heating mode. While operating in the catalyst heating mode, controller 12 may adjust the timing of signal SA sent to ignition system 190, thereby adjusting a timing of the spark provided by spark plug 192. Further, controller 12 may actuate electric machine 52 as well as first clutch 56 to connect electric machine 52 to crankshaft 140 to spin engine 10 electrically.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Figure 2:
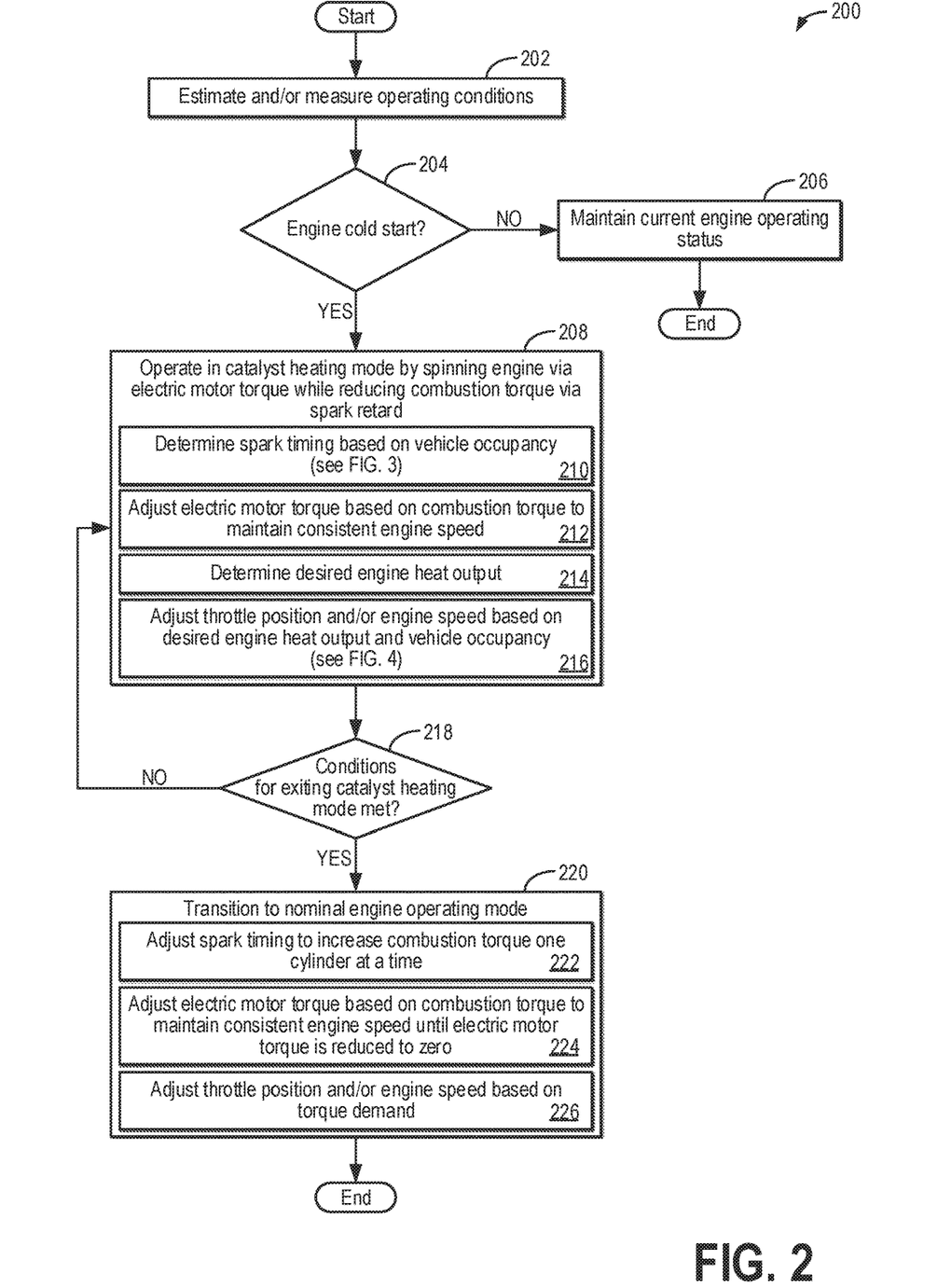
FIG. 2 shows an example method for operating in a catalyst heating mode during an engine cold start.

Next, FIG. 2 shows a flowchart of an example method 200 for operating an engine system of a vehicle (e.g., engine system 100 included in vehicle 5 of FIG. 1) in a catalyst heating mode. For example, the catalyst heating mode may be utilized in a vehicle having a starter motor or electric machine with an operating power of at least 8 kW (e.g., electric machine 52 of FIG. 1) in order to quickly raise a catalyst (e.g., emission control device 178 of FIG. 1) above its light-off temperature. The at least 8 kW starter motor or electric machine is able to spin the engine at a high speed (e.g., at least 1000 RPM) without combustion torque for a prolonged duration (e.g., at least 10 seconds). As a result, the energy from combustion can be used to produce heat for raising the temperature of the catalyst instead of producing engine torque to spin the engine, as described below. By quickly raising the catalyst above its light-off temperature, vehicle cold start emissions may be reduced. Furthermore, by spinning the engine electrically, the amount of heat produced through spark retard is not limited by combustion stability. Further still, different adjustments may be performed during the catalyst heating mode depending on whether the vehicle is occupied or not, such as when the vehicle is an autonomous vehicle (AV) or a non-AV that has been started remotely. Instructions for carrying out method 200 and the rest of the methods included herein may be executed by a controller (e.g., controller 12 of FIG. 1) based on instructions stored on a memory of the controller and in conjunction with signals received from sensors of the engine system, such as the sensors described above with reference to FIG. 1 (e.g., engine coolant temperature sensor 116, exhaust temperature sensor 128, and occupancy sensor 193 of FIG. 1). The controller may employ engine actuators of the engine system (e.g., electric machine 52, spark plug 192, and throttle 162 of FIG. 1) to adjust engine operation according to the methods described below.

Method 200 begins at 202 and includes estimating and/or measuring operating conditions. Operating conditions may include engine speed, engine load, throttle position (e.g., from signal TP output by a throttle position sensor), accelerator pedal position (e.g., signal PP output by a pedal position sensor), engine temperature, catalyst temperature (e.g., as estimated from exhaust temperature sensor 128 of FIG. 1), and ambient temperature (e.g., as measured by an ambient temperature sensor, such as temperature sensor 123 of FIG. 1), for example. Engine speed may be determined based on a signal PIP output by a Hall effect sensor (e.g., Hall effect sensor 120 of FIG. 1), for example. Engine load may be determined based on a measurement of MAF from a MAF sensor (e.g., MAF sensor 122 of FIG. 1). The operating conditions may further include a state of the engine and an ignition state of the vehicle. The state of the engine may refer to whether the engine is on (e.g., operating at a non-zero speed, with combustion occurring within engine cylinders) or off (e.g., at rest, without combustion occurring in the engine cylinders). The ignition state of the vehicle may refer to a position of an ignition switch. As an example, the ignition switch may be in an "off" position, indicating that the vehicle is off (e.g., powered down, with a vehicle speed of zero). As another example, the ignition switch may be in the off position but with an ignition key inserted (e.g., by a vehicle operator), indicating that a vehicle start may soon be requested. As still another example, the vehicle may be on and operating in an electric-only mode, in which an electric machine (e.g., electric machine 52 of FIG. 1) supplies torque to propel the vehicle and the engine is off and does not supply torque to propel the vehicle. The operating conditions may further include an indication of whether the vehicle is an AV or a driver-operated vehicle, such as based on whether controller 12 receives input from a vehicle operator (e.g., operator 130 of FIG. 1) or an AV controller (e.g., AV controller 191 of FIG. 1). The operating conditions may further include an indication of whether the vehicle is occupied or unoccupied, such as when the vehicle is started remotely (e.g., via a remote start device, such as key fob 104 shown in FIG. 1) or when the vehicle is an AV. For example, the controller may determine an occupancy of the vehicle using one or more vehicle occupancy sensors (e.g., vehicle occupancy sensor 193 of FIG. 1). The vehicle may be considered to be occupied when the vehicle occupancy is greater than zero (e.g., at least one operator or passenger is present), and the vehicle may be consider to be unoccupied when the vehicle occupancy is equal to zero (e.g., no operators or passengers are present).

At 204, it is determined if an engine cold start condition is present. The cold start condition may be confirmed when an engine start is requested (e.g., by the vehicle operator or by the AV controller) after a prolonged period of engine inactivity and/or while the engine temperature is lower than a first threshold temperature. For example, the cold start condition may be confirmed when the engine has been inactive for greater than a first threshold duration, which may correspond to a non-zero amount of time (e.g., days, weeks, or months). The first threshold temperature may correspond to a temperature below the nominal engine operating temperature. As another example, the cold start condition may be confirmed when the engine temperature is substantially equal to the ambient temperature (e.g., within a threshold of the ambient temperature, such as within 10 degrees) when the engine start is requested. As still another example, the first threshold temperature may correspond to a light-off temperature of the catalyst, and the cold start condition may be confirmed when the catalyst is below the light-off temperature. As an example, the catalyst temperature may be an inferred catalyst temperature that is modelled based on an exhaust heat computation that takes into fuel flow and spark retard.

If the cold start condition is not present, method 200 proceeds to 206 and includes maintaining the engine operating status. For example, if the engine is off (e.g., at rest, without combustion occurring in engine cylinders), then the engine will remain off. If the engine is on and operating (e.g., at a non-zero speed, with combustion occurring in the engine cylinders), then the engine will remain on to provide torque responsive to operator or AV controller demand. Following 206, method 200 ends.

If the cold start condition is present, method 200 proceeds to 208 and includes operating in the catalyst heating mode by spinning the engine via electric motor torque while reducing combustion torque via spark retard. For example, the engine may be cranked from rest to a speed above a threshold speed (e.g., with the starter motor or electrical machine) while providing fuel and spark to initiate combustion. The threshold speed may correspond to a non-zero speed, such as 1000 RPM. Operating in the catalyst heating mode includes determining the spark timing based on the vehicle occupancy, as will be further described with respect to FIG. 3. For example, the spark timing may be further retarded, such as to a region that produces zero indicated mean effective pressure (IMEP) with minimal variability from engine cycle to engine cycle, when the vehicle has at least one occupant (e.g., the vehicle operator and/or passengers). As another example, the spark timing may be less retarded, such as to a region that produces a non-zero IMEP with high variability from engine cycle to engine cycle, when the vehicle does not have at least one occupant (e.g., when the vehicle is an AV without passengers or remotely started). Spark may then be provided at the determined spark timing for the reduced combustion torque. An amount of fuel provided may be determined based on the engine load and a desired air-fuel ratio (AFR) for minimizing vehicle emissions, for example, such as by the controller inputting the engine load and the desired AFR into a look-up table or function and outputting the amount of fuel.

As an alternative example, when engine cold start occurs during extreme ambient conditions, such as when the ambient temperature is less than a lower threshold temperature (e.g., −40° C.), starting the engine may be prioritized over NVH or emissions; thus, combustion torque may be used to spin the cold (high friction) engine regardless of the vehicle occupancy. In such an example, spark timing may be operated with spark provided near MBT timing, and combustion torque may not be reduced.

Turning briefly to FIG. 3, a graph 300 of a relationship between IMEP and spark timing is shown. The horizontal axis represents the spark timing in crank angle degrees after top dead center (ATDC) of the power stroke. Thus, zero crank angle degrees ATDC refers to a spark timing at TDC of the power stroke, and negative values refer to spark timings occurring before top dead center (BTDC) of the power stroke. The vertical axis represents IMEP, which may also represent indicated torque. Note that at zero IMEP, break mean effective pressure (BMEP) may be negative due to friction mean effective pressure (FMEP). In graph 300, plot 302 represents an average IMEP, plot 304 represents two standard deviations (σ) above the average IMEP (e.g., +2σ), and plot 306 represents two standard deviations below the average IMEP (e.g., −2σ).

The spark timing at which the average IMEP (plot 302) is maximal may be referred to as MBT timing. At and around MBT timing, IMEP variability is minimal; +2σ IMEP (plot 304) and −2σ IMEP (plot 306) approach the average IMEP (plot 302). As spark timing is further retarded from MBT timing, the IMEP variability (e.g., the distance between +2σ IMEP and −2σ IMEP) increases until a peak IMEP variability is reached. If spark is provided at the peak IMEP variability, an amount of torque produced from combustion event to combustion event may vary widely. For example, if spark is provided at 15 degrees ATDC of the power stroke, the piston has already begun traveling downward, resulting in the combustion chamber volume increasing (e.g., from a minimum at TDC). Therefore, the pressure within the cylinder during combustion is reduced. Furthermore, there is a smaller distance for the piston to travel before it reaches BDC, resulting in reduced leverage. Further still, the air fuel mixture may be diffuse throughout the larger volume combustion chamber. As a result, an amount of work produced in the power stroke is reduced and highly variable, and instead of producing torque in the power stroke, a larger amount of energy from the combustion event may be released as heat in the exhaust stroke.

As the spark timing is further retarded from the peak IMEP variability, +2σ IMEP (plot 304) and −2σ IMEP (plot 306) approach the average IMEP (plot 302), which all approach zero (e.g., around 60-90 crank angle degrees ATDC of the power stroke). For example, with spark deeply retarded to 90 degrees ATDC, by the time combustion occurs, much of the piston travel to BDC has taken place, so even if combustion pressure variability occurs, its contribution to work in the power stroke is very small, and the average IMEP (and indicated torque) is reproducibly zero. Therefore, spark may be provided at a timing within diagonally-shaded region 308 when the vehicle is occupied to minimize cycle-to-cycle variation, reducing engine vibration and increasing vehicle customer satisfaction.

However, the engine does not spin while operating at zero IMEP (e.g., negative BMEP) unless electrical assistance is provided. For example, while operating at or near zero IMEP, sufficient torque from an electric motor is provided to overcome a mechanical friction torque of the engine (e.g., FMEP) and maintain the engine at a non-zero, consistent speed. As an example, an amount of electrical power supplied to the electric machine may be held substantially constant (e.g., at 3 kW) to provide substantially constant electric motor torque to maintain a constant engine speed after a higher amount of electric motor torque is initially supplied to accelerate the engine from rest. Thereby, the energy from combustion is used to increase the temperature of the exhaust gas instead of producing torque for rotating the engine, with the engine instead rotated with electric motor torque.

Furthermore, in an unoccupied vehicle, where engine speed variability will not be disturbing to passengers, energy may be conserved by using less electrical assistance. For example, a greater proportion of overall engine torque (e.g., a sum of the combustion torque and the electric motor torque) may be provided by combustion torque than when the vehicle is occupied and the combustion torque produced in the catalyst heating mode is substantially zero (e.g., within a percentage of an amount of torque needed to operate the engine without electric motor torque, such as a percentage in a range of 5-10%). Therefore, spark may be provided at a timing within vertically-shaded region 310, which has higher IMEP variability than diagonally-shaded region 308, when the vehicle is an unoccupied AV.

Returning to FIG. 2, operating in the catalyst heating mode further includes adjusting the electric motor torque based on the combustion torque to maintain a consistent engine speed, as indicated at 212. For example, the controller may monitor the combustion torque and negate the combustion torque by reducing the electric motor torque. The combustion torque may be inferred from crankshaft acceleration during the power stroke, for example. As another example, the combustion torque may be computed from a measured combustion pressure multiplied by crankshaft leverage, which is a function of crankshaft angle. Integrating the combustion torque over an angle produces a work quantity. The work quantity may be subtracted from the average electrical power provided to the electric machine to reduce the electric motor torque. As an example, although spark may be provided in the zero IMEP region shown in FIG. 3 that has minimal cycle-to-cycle variation (e.g., −2σ IMEP and +2σ IMEP approach the mean IMEP) for an occupied vehicle, by adjusting the electric motor torque, any inadvertent cycle-to-cycle variations in combustion torque will not be felt by vehicle occupants (e.g., the vehicle operator and/or any passengers), further increasing customer satisfaction. As another example, in an unoccupied vehicle, where engine speed variations will not be felt, the engine speed may be kept within a threshold engine speed range (e.g., within a threshold of a desired engine speed, such as within 50 RPM) in order to prevent engine stall. As a further example, the threshold engine speed range may be smaller (e.g., within 5 RPM) when the vehicle is occupied.

Operating in the catalyst heating mode further includes determining a desired engine heat output, as indicated at 214. The desired engine heat output (e.g., heat flux) may be determined based on the catalyst temperature at engine start and a desired catalyst temperature (e.g., the light-off temperature of the catalyst). The desired engine heat output may be directly proportional to a difference between the catalyst temperature at engine start and the desired catalyst temperature. For example, at lower catalyst temperatures, the desired engine heat output may be higher, and at higher catalyst temperatures, the desired engine heat output may be lower. As an example, if the light-off temperature of the catalyst is 400° C. and the present catalyst temperature is 20° C., catalyst heating may be maximized, with a desired exhaust heat of 20 to 50 kW.

Operating in the catalyst heating mode further includes adjusting a position of a throttle (e.g., throttle 162 of FIG. 1) and/or the engine speed (via the electric motor) based on the desired engine heat output and the vehicle occupancy, as indicated at 216. By adjusting the throttle position and/or the engine speed, a rate of air flow through the engine is adjusted, which in turn affects an exhaust mass flow (and an amount of exhaust heat). A higher exhaust mass flow (and a higher fuel flow in order to maintain the desired AFR) provides more heat to the catalyst, and a lower exhaust mass flow provides less heat to the catalyst. The controller may determine a combination of throttle position and engine speed adjustments that will produce the desired engine heat output using one or more lookup tables, algorithms, or maps, which may be different for an occupied vehicle versus an unoccupied AV.

Turning briefly to FIG. 4, a graph 400 of example relationships between throttle position and engine speed adjustments for an occupied vehicle (solid plot 402) and an unoccupied vehicle (dashed plot 404) is shown. The horizontal axis represents the engine speed, with the engine speed increasing along the horizontal axis from left to right. The vertical axis represents the throttle position, with an opening of the throttle increasing along the vertical axis from a fully closed position to a fully open position (e.g., wide-open throttle). Increasing desired engine heat output is indicated by the direction of the arrowheads on plots 402 and 404.

As shown in plot 402, as the desired engine heat output increases in an occupied vehicle, the throttle may be further opened while the engine speed is held constant until the throttle approaches the fully open position. If the desired engine heat output is not achieved, the engine speed may be increased, such as by increasing the amount of electrical power supplied to the electric machine to provide additional electric motor torque. In such an example, by first adjusting the throttle position and then adjusting the engine speed as needed based on the desired engine heat output, the engine may be maintained at a substantially constant speed even while the engine heat output is varied, which may increase vehicle customer satisfaction.

As shown in plot 404, as the desired heat output increases in an unoccupied vehicle, the engine speed may be increased to a greater degree and the throttle decreased to a smaller degree at lower engine speeds, and at higher engine speeds, the throttle may be increased to a greater degree and the engine speed increased to a smaller degree. Without vehicle occupants to feel engine speed changes, engine speed increases may be initially performed to increase the engine heat output instead of throttle opening increases because more combustion events occur at a higher engine speed compared with a lower engine speed over a fixed time duration, which may increase an amount of heat produced.

Note that in other examples, the shapes of plots 402 and 404 may differ. For example, each of plots 402 and 404 may be any linear or non-linear plots in which the throttle position and/or the engine speed generally increases as the desired engine heat output increases. Thus, plots 402 and 404 shown in FIG. 4 are illustrative and non-limiting.

Returning to FIG. 2, in some examples, operating in the catalyst heating mode at 208 may further include deactivating a subset of engine cylinders, such as by maintaining corresponding intake and exhaust valves of the subset of engine cylinders closed and disabling fueling and spark to the subset. By deactivating the subset of engine cylinders, cylinder heating may be concentrated to the remaining active cylinders.

At 218, it is determined if conditions for exiting the catalyst heating mode are met. As one example, conditions for exiting the catalyst heating mode may be met in response to the temperature of the catalyst surpassing a second threshold temperature. For example, the second threshold temperature may be the light-off temperature of the catalyst (e.g., 400° C.), above which the catalyst purifies exhaust gas components at high efficiency. The second threshold temperature may be the same as or different than the first threshold temperature for confirming the cold start condition (e.g., as described at 204). As another example, conditions for exiting the catalyst heating mode may include a second threshold duration elapsing (which is less than the first threshold duration for confirming the cold start condition described at 204). The second threshold duration may be a predetermined, fixed time duration, such as a duration in a range of 10-15 seconds, over which the engine is operated in the catalyst heating mode during an engine cold start. Alternatively, the second threshold duration may be adjusted based on operating conditions, such as one or more of the ambient temperature, the engine temperature, and the catalyst temperature when the engine cold start is requested. For example, the controller may input the operating conditions (e.g., the ambient temperature, the engine temperature, and/or the catalyst temperature) into one or more lookup tables, algorithms, and maps and output the corresponding duration for operating in the catalyst heating mode.

If conditions for exiting the catalyst heating mode are not met, method 200 returns to 208 and includes continuing to operate in the catalyst heating mode, with the engine spun electrically while the combustion torque is reduced via spark retard. If conditions for exiting the catalyst heating mode are met, method 200 proceeds to 220 and includes transitioning to a nominal engine operating mode. Transitioning to the nominal engine operating mode includes adjusting the spark timing to increase combustion torque one cylinder at a time, as indicated at 222, adjusting the electric motor torque based on the combustion torque to maintain a consistent engine speed until the electric motor torque is reduced to zero, as indicted at 224, and adjusting the throttle position and/or engine speed based on a torque demand, as indicated at 226. For example, the controller may adjust (e.g., advance) the spark timing of a first cylinder from the determined spark timing for reduced combustion torque (e.g., as determined at 210) to a timing corresponding to a desired engine torque for the given engine speed and load, such as to a timing at or near MBT. The controller may determine the spark timing for increased combustion torque by inputting the engine speed and load into a lookup table, for example. Providing spark at the determined spark timing for increased combustion torque in the first cylinder increases an amount of combustion torque produced in the first cylinder while maintaining the reduced (or substantially zero) combustion torque produced in the remaining cylinders, increasing an overall amount of combustion torque produced in the engine. As a result of the increased combustion torque, the electric motor torque is decreased by a corresponding amount, as described at 212. The controller may then adjust the spark timing of a next (e.g., second) cylinder to the determined spark timing for increased combustion torque and decrease the electric motor torque accordingly. Furthermore, the controller may learn the combustion torque produced by the first cylinder and use this value to more accurately decrease the electric motor torque during the spark timing adjustment in each next cylinder to avoid engine speed disturbances. The controller may continue to adjust the spark timing of each next cylinder one at a time (e.g., one cylinder per engine cycle or per a number of engine cycles) until all of the cylinders are operating with spark provided at the determined spark timing for increased combustion torque and the electric motor torque is reduced to zero. Furthermore, the throttle position and/or engine speed may be adjusted based on torque demand, such as demanded by a vehicle operator or an AV controller. For example, the throttle may be adjusted to a further closed position as the combustion torque is increased in order to prevent a surge in torque output. By gradually transitioning the engine from producing substantially no combustion torque (or a small amount of combustion torque compared with the amount of torque needed to operate the engine at the desired speed) to providing all of the engine torque through combustion, engine speed variation may be reduced, increasing customer satisfaction and/or reducing an incidence of engine stall. Method 200 then ends.

Thus, as illustrated by examples herein, the method of operating and performing actions responsive to a determination of an engine cold start condition may include operating in the cold start condition (e.g., operating with the engine combusting and spinning at a non-zero speed), determining whether that condition is present (such as based on an output of an engine coolant temperature sensor) and performing actions in response thereto, as well as operating without that condition present, determining that the condition is not present, and performing a different action in response thereto. For example, in response to a determination of the engine cold start condition, a controller may transition the engine to operating in a catalyst heating mode by retarding a timing of an ignition spark provided by a spark plug, providing electric motor torque to maintain a speed of the engine above a threshold speed, and adjusting an amount of heat output by the engine by adjusting one or more of a position of an intake throttle and the engine speed. In response to a determination that an engine cold start condition is not present, the engine may be operated in a nominal operating mode. While operating in the nominal operating mode, the controller may adjust the timing of the ignition spark, the engine speed, and the intake throttle position responsive to torque demand. Furthermore, while operating in the catalyst heating mode, in response to a determination that the cold start condition is no longer present (e.g., based on a temperature of an exhaust catalyst or a duration of operating in the catalyst heating mode elapsing), the controller may transition the engine from the catalyst heating mode to operating in the nominal operating mode. Transitioning from the catalyst heating mode to the nominal operating mode may include advancing the timing of the ignition spark cylinder-by-cylinder until no engine cylinders are operating at the retarded timing and no electric motor torque is provided to maintain the speed of the engine above the threshold speed.

Figure 5:
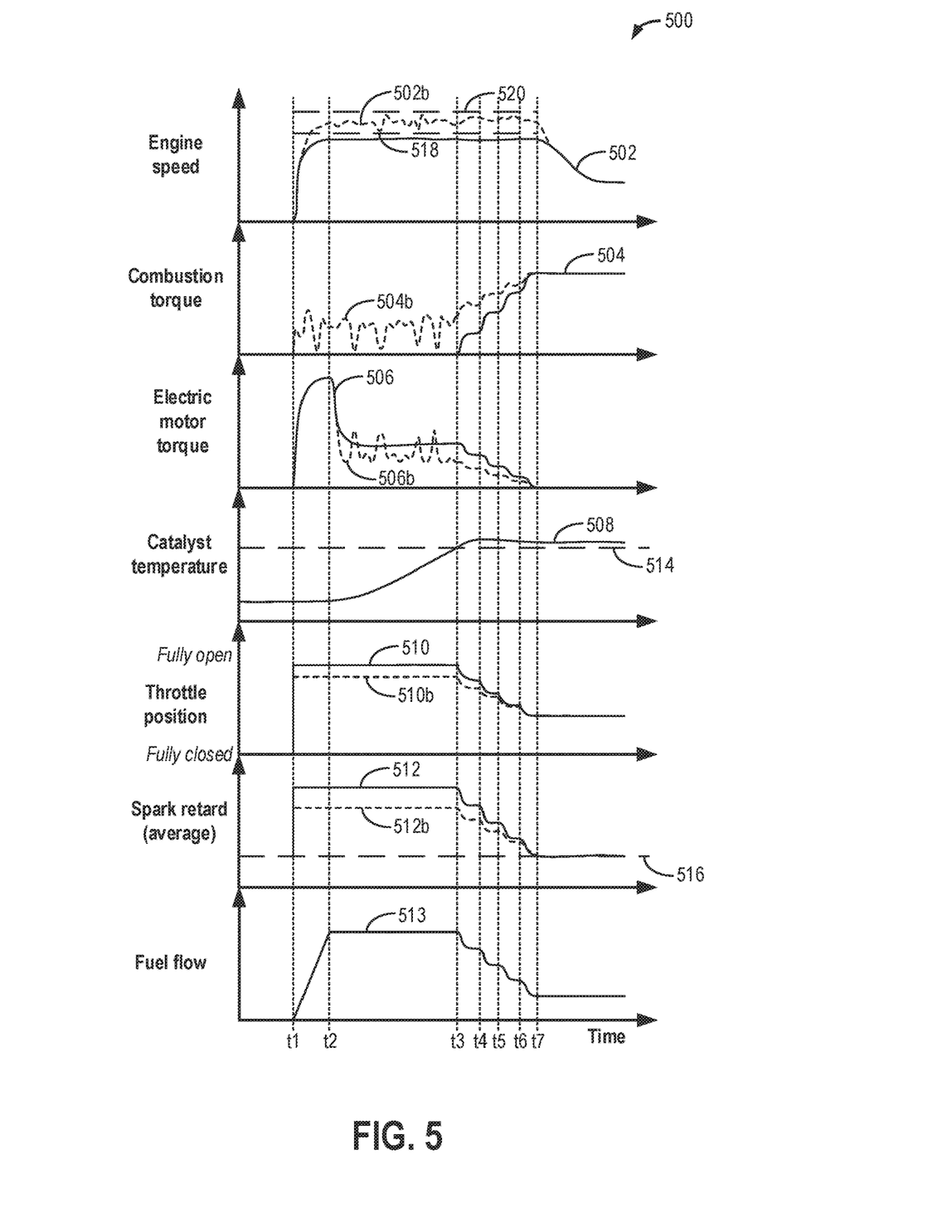
FIG. 5 illustrates a prophetic example timeline of engine parameter adjustments while transitioning into and out of a catalyst heating mode in response to an engine cold start.

Next, FIG. 5 shows an example timeline 500 for heating a vehicle catalyst (e.g., emission control device 178 of FIG. 1) during an engine cold start without a combustion stability limit. For example, the engine may be operated in a catalyst heating mode, such as according to method 200 of FIG. 2. Further, operation in the catalyst heating mode may differ when the vehicle is unoccupied compared to when the vehicle is occupied. Dashed segments are provided for comparison between operating in the catalyst heating mode when the vehicle is occupied (solid lines) versus unoccupied (dashed segments), as will be further described below. Engine speed is shown in plot 502, combustion torque is shown in plot 504, electric motor torque is shown in plot 506, catalyst temperature is shown in plot 508, throttle position is shown in plot 510, spark retard is shown in plot 512, and fuel flow is shown in plot 513. For all of the above, the horizontal axis represents time, with time increasing along the horizontal axis from left to right. The vertical axis represents each labeled parameter, with values increasing along the vertical axis from bottom to top. Dashed line 514 indicates a light-off temperature of the catalyst, above which the catalyst is able to purify exhaust components with high efficiency. Furthermore, MBT spark timing is indicated by dashed line 516. Although dashed line 516 is shown in FIG. 5 as a straight line, it should be understood that MBT spark timing varies based on operating conditions, such as engine speed and load. Further, plot 512 represents an average spark retard across all cylinders of the engine, which includes four cylinders in the example of FIG. 5. Unless otherwise stated below (e.g., during a transition out of the catalyst heating mode), all of the cylinders are operated at the same spark timing, in which case the average spark timing is also equal to the spark timing of each cylinder.

Prior to time t1, the engine is off (e.g., with a speed of zero, as shown in plot 502). Combustion is not occurring in the engine cylinders, and so the combustion torque is equal to zero (plot 504). Furthermore, the engine is not spun electrically, with no electric motor torque applied to the engine by an electric machine (e.g., electric machine 52 of FIG. 1), as shown in plot 506. The throttle is closed (plot 510), and spark (plot 512) and fuel (plot 513) are not provided.

At time t1, an engine start is requested. The requested engine start is a cold start, with the catalyst temperature (plot 508) below the light-off temperature (dashed line 514). Therefore, the engine is operated in the catalyst heating mode. Between time t1 and time t2, the engine speed (plot 502) increases as the engine is cranked with electric motor torque from the electric machine (plot 506). A higher amount of electric motor torque is initially provided between time t1 and time t2 in order to accelerate the engine from rest. Spark is provided at a timing that is highly retarded from MBT timing (plot 512) to ignite a mixture of air and fuel in each cylinder at the highly retarded timing, producing substantially zero combustion torque (plot 504). When the vehicle is unoccupied, spark may be provided at a timing that is less retarded from MBT timing (dashed segment 512b) than when the vehicle is occupied (plot 512), producing non-zero, highly variable combustion torque (dashed segment 504b). The throttle is opened to a high degree (plot 510) to increase airflow through the engine and increase an amount of heat output by the engine. For example, the throttle may be adjusted to a position corresponding to a desired engine heat output, with the desired engine heat output determined based on a difference between the catalyst temperature (plot 508) at time t1 and the light-off temperature (dashed line 514). When the vehicle is unoccupied, the throttle may be opened to a smaller degree (dashed segment 510b) than when the vehicle is occupied (plot 510). Furthermore, the fuel flow (plot 513) is increased to a relatively high amount fuel flow between time t1 and time t2, corresponding to the high airflow through the engine, in order to operate at a desired AFR and provide high exhaust heat output.

In response to the engine reaching a desired high idle operating speed (e.g., 1200 RPM), at time t2, the electric motor torque is decreased (plot 506) and then held substantially constant to overcome the friction of the engine and maintain the high idle speed. Due to the increased airflow through the engine (e.g., due to the further open throttle position and the high idle speed), the high fuel flow (plot 513), and the energy of combustion producing exhaust heat instead of combustion torque, the catalyst temperature (plot 508) increases between time t2 and time t3.

In comparison, when the vehicle is unoccupied, the desired high idle speed may be higher than when the vehicle is occupied (e.g., greater than 1200 RPM), as shown in dashed segment 502b. Electric motor torque (dashed segment 506b) is provided compensate for the reduced combustion torque to maintain the engine speed (dashed segment 502b) within a threshold range defined by a lower bound (dashed line 518) and an upper bound (dashed line 520). Furthermore, between time t2 and time t3, the combustion torque has high cycle-to-cycle variability for the unoccupied vehicle (dashed segment 504b), such as due to high variability in combustion pressure, as described with respect to FIG. 3. Therefore, the electric motor torque provided (dashed segment 506b) is also highly variable.

At time t3, the catalyst temperature (plot 508) reaches the light-off temperature (dashed line 514). (Note that while the catalyst temperature is shown as a single plot and time t3 is shown at the same timing for both the occupied vehicle and the unoccupied AV in the example of FIG. 5, in other examples, the catalyst temperature may increases at different rates using the different adjustments in the occupied vehicle and the unoccupied vehicle in other examples.) As a result, the engine is transitioned out of the catalyst heating mode and into a nominal engine operating mode. The spark timing of a first cylinder of the four cylinders is advanced to MBT timing while the remaining three cylinders remain at the highly retarded timing, resulting in the average spark timing becoming less retarded (plot 512 and dashed segment 512b). As a result, the combustion torque produced in the engine by all four cylinders (plot 504 and dashed segment 504b) increases. In a first example, when the vehicle is occupied, non-zero combustion torque is produced in the first cylinder while the remaining three cylinders continue to produce zero combustion torque. In a second example, when the vehicle is unoccupied vehicle, the remaining three cylinders not operating at MBT spark timing continue to produce lower, variable combustion torque. In response to the increased combustion torque produced by the engine, the electric motor torque (plot 506 and dashed segment 506b) provided to spin the engine decreases by a corresponding amount in order to maintain the engine at a consistent speed (when the vehicle is an occupied vehicle, as shown in plot 502) or within the speed threshold (when the vehicle is an unoccupied AV, as shown in dashed segment 502b). Furthermore, the throttle position (plot 510 and dashed segment 510b) is adjusted to a further closed (e.g., less open) position in order to decrease an amount of airflow through the engine, and the fuel flow (plot 513) is decreased accordingly. By decreasing the airflow through the engine and the fuel flow, the amount of heat output by the engine is decreased.

At time t4, the spark timing of a second cylinder of the four cylinders is advanced to MBT timing while the remaining two cylinders remain at the highly retarded timing, resulting in the average spark timing becoming less retarded (plot 512 and dashed segment 512b). In a first example, when the vehicle is occupied, non-zero combustion torque is produced in the first and second cylinders while the remaining two cylinders continue to produce zero combustion torque. In a second example, when the vehicle is unoccupied, the remaining two cylinders not operating at MBT spark timing continue to produce lower, variable combustion torque. As a result, the average combustion torque produced in the engine by all four cylinders (plot 504 and dashed segment 514b) further increases, and the electric motor torque (plot 506 and dashed segment 506b) provided to spin the engine further decreases in order to maintain the engine at a consistent speed (when the vehicle is an occupied vehicle, as shown in plot 502) or within the speed threshold (when the vehicle is unoccupied, as shown in dashed segment 502b). Furthermore, the throttle position (plot 510 and dashed segment 510b) is further closed, and the fuel flow (plot 513) is further decreased.

At time t5, the spark timing of a third cylinder of the four cylinders is advanced to MBT timing while a fourth cylinder continues to operate at the highly retarded timing, resulting in the average amount of spark retard further decreasing (plot 512 and dashed segment 512b). In a first example, when the vehicle is occupied, non-zero combustion torque is produced in the first, second, and third cylinders while the fourth cylinder continues to produce zero combustion torque. In a second example, when the vehicle is unoccupied, the fourth cylinder continues to produce lower, variable combustion torque. As a result, the average combustion torque produced in the engine by all four cylinders (plot 504 and dashed segment 504b) increases further still, and the electric motor torque (plot 506 and dashed segment 506b) provided to spin the engine is decreased accordingly in order to maintain the engine at a consistent speed (when the vehicle is an occupied vehicle, as shown in plot 502) or within the speed threshold (when the vehicle is an unoccupied vehicle, as shown in dashed segment 502b). Furthermore, the throttle position (plot 510 and dashed segment 510b) is further closed, and the fuel flow (plot 513) is further decreased.

At time t6, the spark timing of the fourth cylinder is advanced to MBT timing, resulting in an average spark timing (plot 512 and dashed segment 512b) equal to MBT timing (dashed line 516) by time t7. With all four of the cylinders operating with spark provided at or near MBT timing (e.g., to maximize combustion torque), the combustion torque (plot 504 and dashed segment 504b) is sufficient to maintain the engine speed (plot 502 and dashed segment 502b), and so the electric motor torque is reduced to zero (plot 506 and dashed segment 506b) by time t7. The throttle is adjusted to a further closed position (plot 510 and dashed segment 510b) corresponding to idle engine operation outside of the catalyst heating mode. Furthermore, after time t7, the engine speed is decreased to a low idle speed (e.g., a nominal idle speed of the engine). With all of the engine cylinders operating with a spark timing (plot 512) at or near MBT timing (dashed line 516) after time t7, the combustion torque produced has low cycle-to-cycle variability (plot 504) and the engine speed has low variability (plot 502) for both an occupied vehicle and an unoccupied vehicle. After time t7, the throttle position (plot 510) and the engine speed (plot 502) may be adjusted responsive to torque demand, such as demanded by a vehicle operator or an AV controller (e.g., AV controller 191 of FIG. 1).

In this way, energy from combustion is utilized to heat a catalyst in response to an engine cold start instead of providing torque to spin the engine, increasing an amount of heat output by the engine. As a result of spinning the engine electrically and producing no or little combustion torque, the catalyst may reach its light-off temperature faster than when the energy from combustion is used to produce torque for spinning the engine, decreasing vehicle emissions during the cold start. Furthermore, by adjusting an airflow rate through the engine, such as by adjusting a position of an intake air throttle or adjusting the engine speed, an amount of heat output by the engine may be controlled independently of combustion stability. Further still, with an amount of combustion torque produced reduced to zero via highly retarded spark timing, cycle-to-cycle combustion torque variability is minimized. As a result, engine speed variations are minimized, reducing noise, vibration, and harshness (NVH) issues and increasing customer satisfaction during the cold start. Furthermore, by retarding spark timing to a smaller degree and producing more (and more variable) combustion torque when the vehicle is unoccupied, less electric motor torque may be used, decreasing electric power consumption.

The technical effect of deeply retarding spark timing while spinning the engine electrically is that energy from combustion may be used to expedite catalyst heating instead of providing combustion torque, with an amount of heat output by the engine varied by adjusting one or more of throttle position and engine speed.

As one example, a method comprises: during a cold start of an engine, applying an ignition spark to combust fuel and a portion of air entering the engine at an ignition timing set to produce substantially zero combustion torque while rotating the engine with an electric motor and maintaining an engine speed greater than a threshold speed via electric motor torque; and adjusting the amount of air entering the engine based on a desired engine exhaust heat. In the preceding example, additionally or optionally, the ignition timing set to produce substantially zero combustion torque is within a spark timing region that corresponds to a cylinder indicated mean effective pressure of substantially zero. In any or all of the preceding examples, additionally or optionally, the rotating the engine with the electric motor includes rotating the engine at a substantially constant speed. In any or all of the preceding examples, additionally or optionally, a substantially constant amount of electrical power is supplied to the electric motor, the substantially constant amount of electrical power producing enough electric motor torque to overcome a mechanical friction force of the engine and rotate the engine at the speed greater than the threshold speed. In any or all of the preceding examples, the method additionally or optionally further comprises determining an amount of combustion torque produced; and reducing the amount of electrical power supplied to the electric motor to negate the determined amount of combustion torque. In any or all of the preceding examples, additionally or optionally, adjusting the amount of air entering the engine based on the desired engine exhaust heat includes increasing an opening of a throttle coupled to an air intake of the engine and/or increasing the engine speed via the electric motor as the desired engine exhaust heat output increases. In any or all of the preceding examples, additionally or optionally, the desired engine exhaust heat is determined based on a difference between a temperature of a catalyst coupled to the engine exhaust and a light-off temperature of the catalyst. In any or all of the preceding examples, the method additionally or optionally further comprises, after the temperature of the catalyst reaches the light-off temperature, gradually increasing an amount of combustion torque produced while decreasing an amount of electric motor torque used to spin the engine by a corresponding amount until no electric motor torque is used to spin the engine. In any or all of the preceding examples, additionally or optionally, the engine includes multiple cylinders, and gradually increasing the amount of combustion torque produced includes advancing a timing of the ignition spark one cylinder at a time until every cylinder is operating with the advanced timing. In any or all of the preceding examples, additionally or optionally, advancing the timing of the ignition spark includes providing the ignition spark at a timing that produces maximal combustion torque.

As a second example, a method comprises: in response to a cold start condition of an engine included in a vehicle, providing spark to ignite fuel and a portion of air entering the engine at an ignition timing retarded from a timing for maximum break torque, the retarded ignition timing determined based on an occupancy of the vehicle and provided while providing electric motor torque to the engine via an electric machine to maintain a speed of the engine above a threshold speed; and adjusting one or more of a position of a throttle coupled to an air intake passage of the engine and the engine speed, maintained by the electric machine, based on a temperature of a catalyst coupled to an exhaust passage of the engine and the occupancy of the vehicle. In the preceding example, additionally or optionally, providing spark at the ignition timing determined based on the occupancy of the vehicle includes retarding spark from the timing for maximum break torque to a greater degree when the vehicle is an occupied vehicle and retarding spark from the timing for maximum break torque to a smaller degree when the vehicle is an unoccupied vehicle. In any or all of the preceding examples, additionally or optionally, the occupied vehicle is one of a driver-operated vehicle and an autonomous vehicle with one or more passengers, and the unoccupied vehicle is an autonomous vehicle without passengers. In any or all of the preceding examples, additionally or optionally, retarding spark from the timing for maximum break torque to the greater degree includes providing spark at a timing that produces substantially zero combustion torque, and retarding spark from the timing for maximum break torque to the smaller degree includes providing spark at a timing that produces variable combustion torque. In any or all of the preceding examples, additionally or optionally, adjusting one or more of the position of the throttle and the engine speed based on the temperature of the catalyst and the occupancy of the vehicle includes, for the same catalyst temperature, adjusting the position of the throttle to a greater degree and the engine speed to a smaller degree when the vehicle is an occupied vehicle and adjusting the position of the throttle to a smaller degree and the engine speed to a greater degree when the vehicle is an unoccupied vehicle.

As another example, a system comprises: an engine including a plurality of cylinders coupled to a crankshaft, each cylinder including a spark plug for initiating combustion; an electric motor coupled to the crankshaft receiving electrical power from a system battery; a throttle valve coupled within an intake passage of the engine; an engine coolant temperature sensor for estimating an engine temperature; a temperature sensor for inferring a temperature of a catalyst coupled in an exhaust passage of the engine; and a controller storing executable instructions in non-transitory memory that, when executed, cause the controller to: operate the engine in a catalyst heating mode during a cold start condition, the catalyst heating mode including retarding a timing of a spark produced by the spark plug to reduce an amount of torque produced through combustion while spinning the engine via torque from the electric motor to maintain the engine above a threshold speed; adjust an airflow through the engine while operating in the catalyst heating mode based on a desired heat flux through the engine; and transition from the catalyst heating mode to a nominal engine mode based on at least one of a temperature of the catalyst surpassing a threshold temperature and a threshold duration of operating in the catalyst heating mode elapsing. In the preceding example, additionally or optionally, operating in the catalyst heating mode further comprises adjusting an amount of torque from the electric motor based on the amount of torque produced through combustion. In any or all of the preceding examples, additionally or optionally, the desired heat flux through the engine is determined based on the temperature of the catalyst, and adjusting the airflow through the engine includes increasing at least one of the engine speed and an opening of the throttle valve as the desired heat flux through the engine increases.

In any or all of the preceding examples, the system additionally or optionally further comprises an autonomous vehicle controller and a vehicle occupancy sensor, each of the autonomous vehicle controller and the vehicle occupancy sensor communicatively coupled to the controller, and wherein the controller stores further executable instructions in non-transitory memory that, when executed while operating in the catalyst heating mode, cause the controller to: determine an occupancy of the vehicle based on output from the vehicle occupancy sensor; retard the timing of the spark produced by the spark plug to a greater degree when the occupancy is at least one and retard the timing of the spark produced by the spark plug to a smaller degree when the occupancy is less than one; and increase the engine speed to a smaller degree when the occupancy is at least one and increase the engine speed to a greater degree when the occupancy is less than one for a same desired heat flux through the engine. In any or all of the preceding examples, additionally or optionally, transitioning from the catalyst heating mode to a nominal engine mode comprises: advancing the timing of the spark produced by the spark plug of each cylinder of the plurality of cylinders one-by-one over a number of engine cycles until none of the cylinders are operating at the retarded timing and the torque from the electric motor is reduced to zero.

In another representation, a method comprises: in response to a cold start condition of a spark ignition engine included in an autonomous vehicle, determining an occupancy of the vehicle; providing spark at a timing determined based on the occupancy of the vehicle; providing electric motor torque via an electric machine to maintain a speed of the engine within a threshold range while providing spark at the determined timing; and adjusting one or more of a position of a throttle coupled to an intake passage of the engine and the engine speed via the electric machine based on a temperature of a catalyst coupled to an exhaust passage of the engine and the occupancy of the vehicle. In the preceding example, additionally or optionally, providing the spark at a timing determined based on the occupancy of the vehicle includes providing the spark further retarded from a timing corresponding to maximum break torque timing when the occupancy is at least one and providing the spark less retarded from the timing corresponding to maximum break torque timing when the occupancy is less than one. In any or all of the preceding examples, additionally or optionally, the adjusting one or more of the position of the throttle coupled to the intake passage of the engine and the engine speed via the electric machine based on the temperature of the catalyst coupled to the exhaust passage of the engine and the occupancy of the vehicle includes, for the same catalyst temperature, adjusting the position of the throttle to a greater degree and the engine speed to a smaller degree when the occupancy is at least one and adjusting the position of the throttle to a smaller degree and the engine speed to a greater degree when the occupancy is less than one. In any or all of the preceding examples, additionally or optionally, the threshold range is smaller when the occupancy is at least one compared to when the occupancy is less than one.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
in response to a cold start condition of an engine included in a vehicle,
providing a spark to ignite fuel and a portion of air entering the engine at an ignition timing retarded from a timing for maximum brake torque, the retarded ignition timing determined based on an occupancy of the vehicle and provided while providing electric motor torque to the engine via an electric machine to maintain an engine speed of the engine above a threshold speed; and
adjusting one or more of a position of a throttle coupled to an air intake passage of the engine and the engine speed, maintained by the electric machine, based on a desired heat output of the engine and the occupancy of the vehicle, including adjusting the position of the throttle while holding the engine speed constant when the vehicle is an occupied vehicle and adjusting the position of the throttle to a further open position while increasing the engine speed as the desired heat output of the engine increases when the vehicle is an unoccupied vehicle, including increasing the engine speed to a greater degree and adjusting the position of the throttle to a smaller degree at lower engine speeds and increasing the engine speed to a smaller degree and adjusting the position of the throttle to a greater degree at higher engine speeds.

2. The method of claim 1, wherein providing the spark at the ignition timing determined based on the occupancy of the vehicle includes retarding the spark from the timing for maximum brake torque to a greater degree when the vehicle is the occupied vehicle and retarding the spark from the timing for maximum brake torque to a smaller degree when the vehicle is the unoccupied vehicle.

3. The method of claim 1, wherein the occupied vehicle is one of a driver-operated vehicle and an autonomous vehicle with one or more passengers, and the unoccupied vehicle is the autonomous vehicle without passengers.

4. The method of claim 2, wherein retarding the spark from the timing for maximum brake torque to the greater degree includes providing the spark at a first timing that produces substantially zero combustion torque, and retarding the spark from the timing for maximum brake torque to the smaller degree includes providing the spark at a second timing that produces variable combustion torque.

5. The method of claim 1, wherein adjusting the position of the throttle while holding the engine speed constant when the vehicle is the occupied vehicle includes, as the desired heat output of the engine increases, adjusting the position of the throttle to the further open position until the position of the throttle reaches a fully open position.

6. The method of claim 5, further comprising increasing the engine speed responsive to a heat output of the engine not meeting the desired heat output of the engine when the position of the throttle reaches the fully open position.

7. The method of claim 1, wherein the desired heat output of the engine is determined based on a temperature of a catalyst coupled to an exhaust passage of the engine and a desired temperature of the catalyst.

* * * * *